Nov. 29, 1949 A. BÜCHI Re. 23,172

COOLING DEVICE FOR TURBINE ROTORS

Original Filed Oct. 15, 1941 2 Sheets-Sheet 1

Inventor:
Alfred Büchi
by Sommers & Young
Attorneys

Nov. 29, 1949 A. BÜCHI Re. 23,172

COOLING DEVICE FOR TURBINE ROTORS

Original Filed Oct. 15, 1941 2 Sheets-Sheet 2

Inventor:
Alfred Büchi
by Sommers & Young
Attorneys

Reissued Nov. 29, 1949

Re. 23,172

UNITED STATES PATENT OFFICE 23,172

COOLING DEVICE FOR TURBINE ROTORS

Alfred Büchi, Winterthur, Switzerland

Original No. 2,364,189, dated December 5, 1944, Serial No. 415,136, October 15, 1941. Application for reissue December 13, 1947, Serial No. 791,673. In Switzerland September 21, 1940

6 Claims. (Cl. 60—41)

This invention relates to cooling devices for turbine rotors for hot power fluids.

According to the present invention, on the disc of the bucket wheel or turbine rotor, cooling fan blading is arranged, which has the function to sweep and cool the wheel disc of the turbine rotor and the bucket arrangement connected thereto, by the delivery of said blading providing the cooling means.

The arrangement may be such that the cooling medium delivered by the fan blading also imparts inherent energy to the turbine buckets and is passed from the inlet to the exit side of the turbine bucket arrangement at the region of the base portions of the buckets. However, part of the delivery of the cooling fan means may be blown through passages disposed adjacent to the point of connection of the turbine buckets with the turbine rotor, by which provision the bucket connecting means are additionally cooled and heat conduction towards the body of the turbine rotor is prevented.

The turbine rotor may be provided with fan blading only on that of its end faces adjacent the inlet side of the turbine for the power fluid, or on both end faces. Exteriorly beyond the cooling fan blading diffuser or guide vanes may be arranged in the stationary part of the turbine casing surrounding the turbine rotor, for conveying the cooling means towards the bucket arrangement of the turbine. For the purpose of obtaining effective transmission of heat from the turbine rotor to the cooling means the fan blades are made integral with the turbine rotor. The fan blading employed may be of any suitable type and the disposition of the blading may be chosen to suit requirements.

The bearing arrangement of the turbine rotor may be such that the rotor projects freely therefrom with one rotor end face unobstructed so that cooling air can be directly guided towards the cooling fan blading from without unimpeded.

Figure 1:
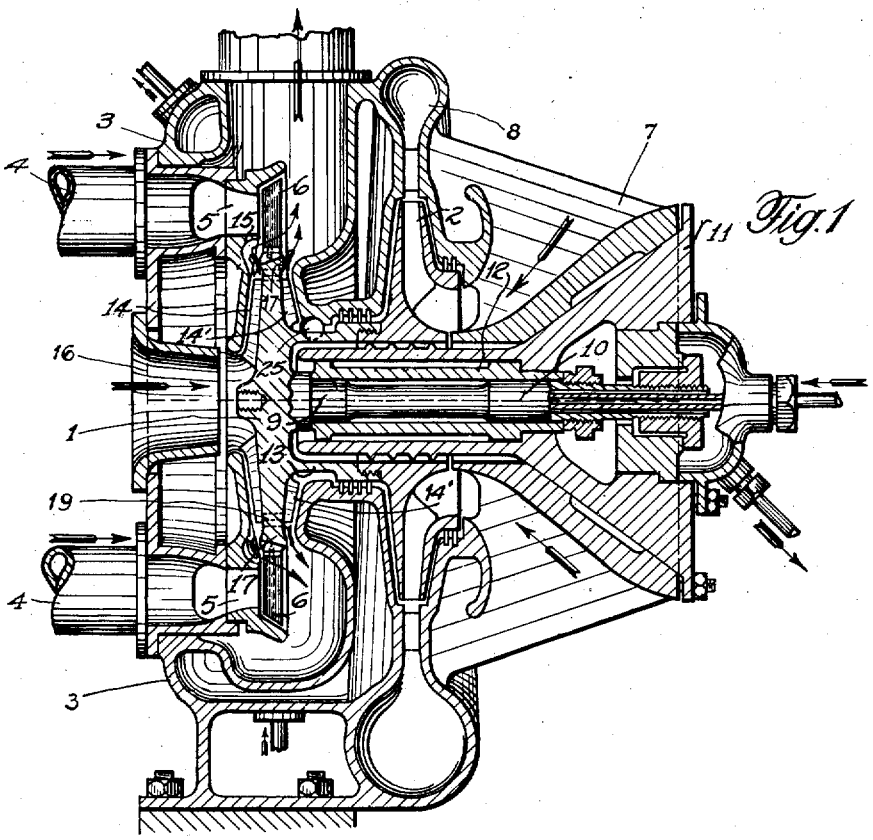
Figure 2:
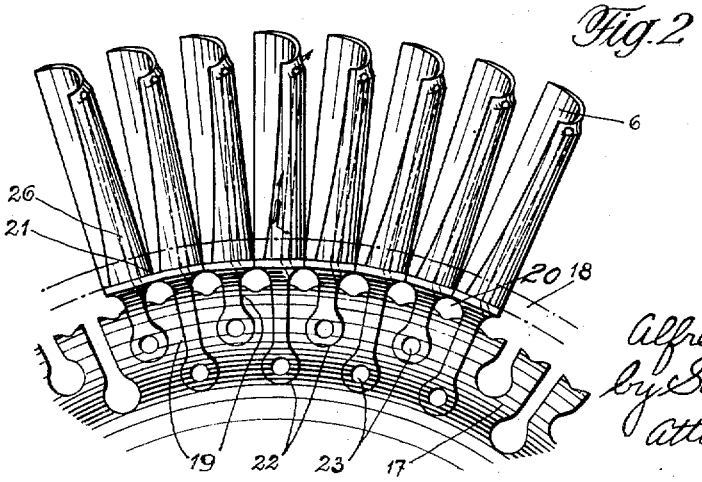
Figure 5:
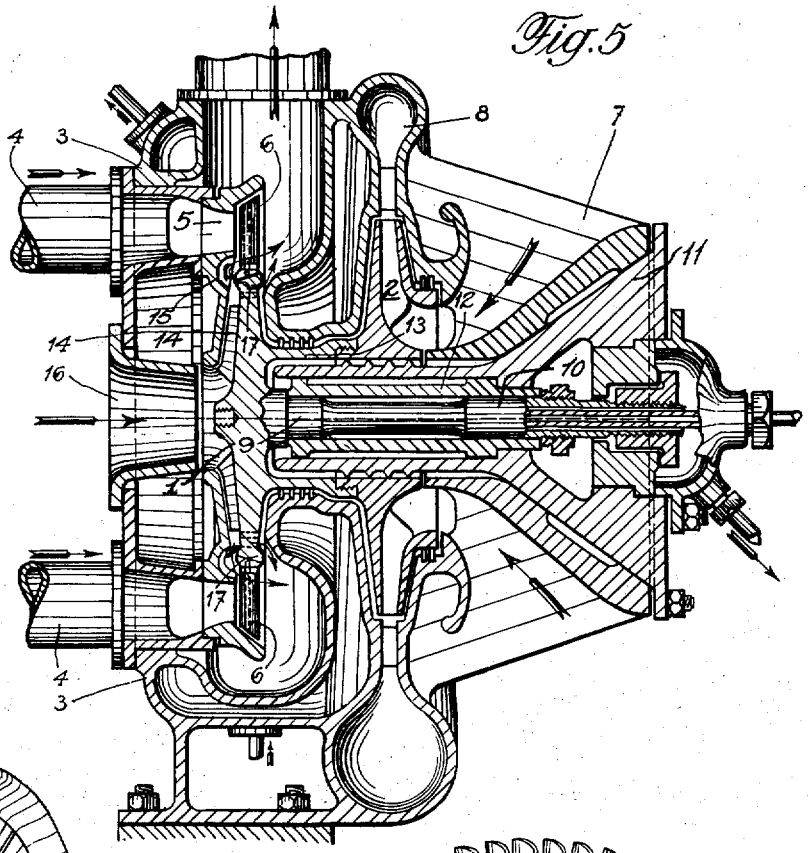
Figure 4:
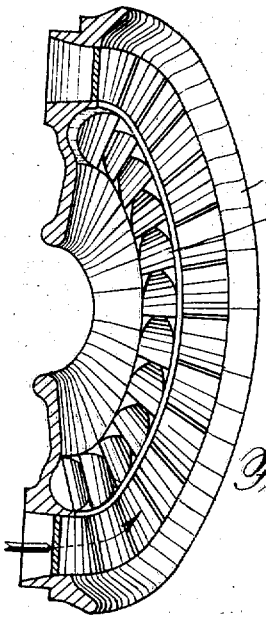
Figure 3:
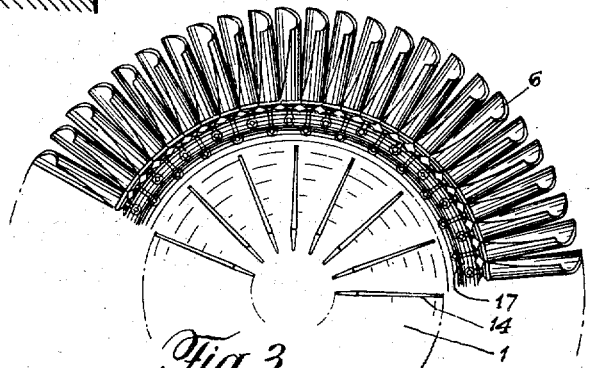

In the accompanying drawings embodiments of the invention are illustrated by way of example only, in which Fig. 1 is a sectional view of a single-stage turbine driven blower, cooling fan bladings being arranged on both end faces of the turbine rotor;

Figs. 2, 3 and 4 show details of means for the guidance of the cooling medium delivery of the cooling fan, and Fig. 5 shows a section of a single-stage gas turbine driven blower provided with cooling fan blading only on the end face of the turbine rotor situated at the inlet side of the turbine for the power fluid.

In Fig. 1, the turbine rotor is designated by 1, whereas the numeral 2 denotes the blower rotor driven by the turbine rotor. A two-part cooled turbine casing 3 surrounds the blower rotor. The numerals 4 and 5 refer to the gas supply conduits leading into the turbine and the nozzle-ring respectively, the gases being projected onto the bucket arrangement 6 of the turbine rotor 1 through said ring. The intake of the blower is designated by 7, and 8 refers to the diffuser casing of the blower. The turbine rotor 1 has its bearings 9, 10 in a bearing sleeve 12 inside of a stationary bearing support 11 within the blower casing, and the blower rotor 2 is connected to the turbine rotor 1 by a sleeve-like extension 13.

The invention is concerned with the cooling fan bladings 14 and 14′ arranged on either end face of the turbine rotor 1, as shown in Fig. 1. By the action of the bladings 14, 14′ the cooling medium, which may be air or the like, is sucked in in the region of the hub portion of the blower rotor, and is conveyed towards the outer end face of the turbine rotor. During the passage of the air through the bladings 14 and/or 14′ this air first cools the bucket wheel disc 1 and keeps on cooling in this way until it leaves the blading 14 or 14′ respectively. Thereupon the cooling air, when leaving the blading 14, is deflected by the stationary diffuser blading 15 into the rotating bucket arrangement 6 of the turbine rotor 1, so that a film of cold air is blown through the bucket arrangement in between the hot power gases, which pass through the turbine bucket arrangement 6 at a point disposed radially further outward, and the base extensions 19 of the buckets. By this means not only the end walls of the turbine rotor, the base extensions 19 and the inner portions 18 of the buckets are cooled, but the heat flux passing from the hot gases conveyed through the outermost portions of the buckets 6 towards the body of the rotor 1 is considerably reduced at the same time and the radially outer bucket portions are also cooled. Cooling air is supplied from without at the inlet side of the turbine through the supply funnel 16, if, as shown in Fig. 1, a freely projecting turbine wheel with an unobstructed outer end face is used.

The air drawn in and delivered by the cooling fan blading 14′ is supplied to the latter from without through bores 25. The numeral 15 refers to cooling air diffuser blades being, for example, arranged exteriorly of the fan rotor in the stationary part of the turbine, and, if desired, sunk in the material of said part. The diffuser blades 15 deflect the air delivered by the blading 14 to the right in Fig. 1 into the inner portion of the turbine buckets 6, advantageously, at such an angle that in addition to producing a cooling effect this air imparts inherent energy thereof to the turbine rotor 1. In order to provide for deflecting the cooling air with as little loss of energy as possible on the turbine rotor 1 at a point radially beyond the cooling fan blading 14 a thickened portion 17 aerodynamically improving the deflecting of the cooling medium into the diffuser blades 15 may be arranged on one or both end faces of said rotor.

Fig. 2 is a view of a segment of the turbine bucket arrangement on a larger scale showing the path along which the cooling air flows through the turbine bucket arrangement 6. The radially inner portions 18 of the turbine bucket arrangement 6 are cooled by the air passing out of the diffuser blading 15 for the cooling air. The base extensions 19 of the turbine buckets 6 are so shaped that adjacent to the joints 21 between the individual buckets and, upon choice, also in the adjoining portions of the turbine rotor 1, passages 20 are formed through which at least part of the air output of the cooling fan is conveyed towards the exit side of the turbine buckets 6. By this means the base extensions 19 and the radially outer portions of the turbine rotor 1 are cooled. In order that the turbine bucket arrangement 6 is nevertheless, firmly secured to the turbine rotor 1 the arrangement is so chosen that adjacent turbine buckets touch each other on the outside of the surfaces 21.

In an arrangement of the base portions 19 as shown in Fig. 2, for example, also the cylindrical base extensions 22 of the buckets are provided with passages 23. Through the passages 23 a further portion of the air delivered by the cooling fan will pass and thus additionally cool the base extensions 19 directly, whereby the turbine rotor 1 is cooled indirectly, in addition. By virtue of the cooling thus provided not only the temperature of the turbine rotor and that of the base extensions is brought down and, consequently, greater strength of material is obtained for these parts even at high temperatures of the power gas, but also reduced straining due to expansion by heat of the parts fitted together results, and improved resistivity of the assembly at the same time.

Alternatively, part of the cooling air at least may, as also shown in Fig. 2, be passed through bores 26 provided in the turbine buckets 6 which bores receive, for example, the cooling air leaving the passages 20, or other cooling air. By this means the buckets 6 are directly additionally cooled over all the length thereof and, advantageously, near their entrance portions for the hot gases.

In Fig. 3 the cooling fan blades, which are designated by 14, are preferably in the form of radial blades for reasons of strength. This blade arrangement ensures minimum straining of the turbine rotor and, if made integrally with the turbine rotor 1, maximum heat transmission from the rotor to the cooling medium is ensured at the same time. By the flow of air passing through between the blades 14 and 14' the turbine rotor is satisfactorily cooled.

In Fig. 4 the stationary diffuser blade arrangement 15 for deflecting the cooling air into the turbine bucket arrangement 6 is shown, as seen in the direction from the turbine rotor, together with the nozzle-like blading 5 for the power fluid of the turbine, which blading is disposed radially outwardly and guides the entering hot gases.

Fig. 5 shows an exhaust gas turbine driven blower having a cooling fan blading 14 only on the end face of the rotor 1 adjacent the gas inlet side of the turbine.

The invention can be applied also to turbines into which the power fluid is introduced in various other directions of flow, and may further be applied to individual rotors or all the rotors of multi-stage turbines. The invention has the great advantage that a considerable proportion of the energy consumed for the conveyance of the cooling medium is recovered and any substantial losses, due to change of direction of flow are avoided.

Owing to the temperature of the cooling medium rising already while the latter cools the turbine rotor disc, the gathering up of heat by said medium is more effective than if the cooling medium would be conducted into the turbine bucket arangement directly from outside without being preheated.

I claim:

1. In a cooling device for turbine rotors for hot power fluids, a turbine rotor having a disc-shaped wheel body, a bucket arrangement disposed on said wheel body, cooling fan blading means provided on said wheel body in driving association with said rotor for delivering a cooling fluid, a casing for said rotor having inlet and outlet ports for passing hot power fluids through the bucket arrangement, said casing also including side walls, the wall on the inlet side of the turbine providing conduction means for said cooling fluid, delivered by said fan blading means for directing the cooling fluid outwardly, sweeping and thus cooling said wheel body and then changing the direction of flow of the cooling fluid at the periphery of the wheel body so as to pass through the rotor between the buckets and inwardly of the hot power fluids to form a cooling and insulating layer to cool and protect the roots of the buckets and the rotor body from hot power fluids and flow-directing means arranged in the conduction means of the casing exteriorly beyond said cooling fan blading means immediately adjacent the rotor body for guiding said cooling fluid in a direction to assist rotation of the rotor.

2. In a cooling device for turbine rotors for hot power fluids, a turbine rotor having a disc-shaped wheel body, a bucket arrangement disposed on said wheel body, cooling fan blading means provided on said wheel body in driving association with said rotor for delivering a cooling fluid, a casing for said rotor having inlet and outlet ports for passing hot power fluids through the bucket arrangement, said casing also including side walls, the wall on the inlet side of the turbine providing conduction means for said cooling fluid, delivered by said fan blading means for directing the cooling fluid outwardly, sweeping and thus cooling said wheel body and then changing the direction of flow of the cooling fluid at the periphery of the wheel body so as to pass through the rotor between the buckets and inwardly of the hot power fluids to form a cooling and insulating layer to cool and protect the roots of the buckets and the rotor body from hot power fluids, vanes arranged in the conduction means of the casing exteriorly beyond said cooling fan blading means immediately adjacent the rotor body for guiding said cooling fluid in a direction to assist rotation of the rotor, and thickenings disposed on an unobstructed end face of said rotor, in advance of said inclined vanes as regards the flow of said cooling fluid, for aerodynamically improving the passage of said flow into said inclined vanes.

3. In a cooling device for turbine rotors for hot power fluids, a turbine rotor having a disc-shaped wheel body, a bucket arrangement disposed on said wheel body, cooling fan blading means provided on said wheel body in driving association with said rotor for delivering a cooling fluid, a casing for said rotor having inlet and outlet ports for passing hot power fluids through the bucket arrangement, said casing also including side walls, the wall on the inlet side of the turbine providing conduction means for said cooling fluid, delivered by said fan blading means for directing the cooling fluid outwardly, sweeping and thus cooling said wheel body and then changing the direction of flow of the cooling fluid at the periphery of the wheel body so as to pass through the rotor between the buckets and inwardly of the hot power fluids to form a cooling and insulating layer to cool and protect the roots of the buckets and the rotor body from hot power fluids, flow-directing vanes arranged in the conduction means of the casing exteriorly beyond said cooling fan blading means immediately adjacent the rotor body for guiding said cooling fluid in a direction to assist rotation of the rotor, and thickenings disposed on both end faces of said rotor radially outwardly of said fan blading means in opposition to the cooling fluid inlet end of said vanes, for aerodynamically improving the flow of cooling fluid toward the turbine exit.

4. In a cooling device for turbine rotors for hot compressed power fluids, a turbine rotor having a wheel body adjacent at least one side of which cooling fluid is adapted to be admitted, a peripheral bead-like diverting edge on said wheel body, a casing covering a cooling fluid inlet side of said wheel body and having inlet and outlet ports for the hot power fluids, a bucket arrangement on said wheel body surrounding said edge and having concave buckets, lateral cooling blower blading means on said rotor body blowing said cooling fluid in a substantially axial direction through said rotor in a general course continually leading toward said outlet port, a portion at least of said cooling fluid moving across said bead-like diverting edge toward the inner bucket portions in an aerodynamically improved flow by virtue of said bead-like edge, a depressed annular face on said casing having a radially outer cross sectional curvature inclining toward the axial direction, diffuser blades arranged on said annular face, and a diffuser assembled of said bead-like edge and said diffuser blade carrying annular face, the said diffuser pressing said cooling fluid flow through the inner bucket portions in work producing contact therewith independently of the power fluid flowing through the outer bucket portions and modifying the flow properties of said cooling fluid in accordance with those of said power fluid for preventing said two fluids from admixing in said buckets.

5. In a cooling device for turbine rotors for hot compressed power fluids, a turbine rotor having a wheel body adjacent at least one side of which cooling fluid is adapted to be admitted, a peripheral cooling fluid diverting edge on said wheel body, a casing covering a cooling fluid inlet side of said wheel body and having inlet and outlet ports for the hot power fluids, a bucket arrangement on said wheel body surrounding said edge and having concave buckets, a base extension on the individual buckets anchored in the peripheral portion of said wheel body, said peripheral wheel body portion having passages between adjacent ones of said base extensions adapted to pass a portion of said cooling pressure fluid axially through from one wheel face to the other for cooling the discharge ends of said buckets, another cooling fluid portion moving across said diverting edge toward the inner bucket portions, a diffuser, formed by said diverting edge together with cooperative means on said casing, the said diffuser pressing said cooling fluid flow through the inner bucket portions in work producing contact therewith independently of the power fluid flowing through the outer bucket portions and modifying the flow properties of said cooling fluid in accordance with those of said power fluid for preventing said two fluids from admixing in said buckets.

6. In a cooling device for turbine rotors for hot power fluids, a turbine rotor having a disc-shaped wheel body, a bucket arrangement disposed on said wheel body, cooling fan blading means provided on said wheel body in driving association with said rotor for delivering a cooling medium, a casing for said rotor having inlet and outlet ports for passing hot power fluids through the bucket arrangement, said casing also including side walls, the wall on the inlet side of the turbine providing conduction means for said cooling medium, delivered by said fan blading means for directing the cooling medium outwardly, sweeping and thus cooling said wheel body and then changing the direction of flow of the cooling medium at the periphery of the wheel body so as to pass, as seen in an axial section through the turbine rotor, axially across the rotor periphery to form a cooling and insulating layer to cool and protect the roots of the buckets and the rotor body from the hot power fluids, and flow-directing vanes arranged in the conduction means of the casing exteriorly beyond said cooling fan blading means immediately adjacent the rotor body for guiding said cooling medium into said bucket arrangement in the direction, but inwardly of the movement of the hot power fluids passing through said bucket arrangement.

ALFRED BÜCHI.

REFERENCES CITED

The following references are of record in the file of this patent:

UNITED STATES PATENTS

| Number | Name | Date |
|---|---|---|
| 1,368,751 | Rateau | Feb. 15, 1921 |
| 1,926,225 | Birmann | Sept. 12, 1933 |
| 2,141,401 | Martinka | Dec. 27, 1938 |
| 2,165,448 | Browne | July 11, 1939 |

FOREIGN PATENTS

| Number | Country | Date |
|---|---|---|
| 452,412 | Great Britain | Aug. 24, 1936 |
| 781,057 | France | Feb. 18, 1935 |
| 782,541 | France | Mar. 18, 1935 |
| 317,516 | Germany | Dec. 19, 1919 |
| 346,599 | Germany | Jan. 5, 1922 |
| 491,738 | Germany | Feb. 12, 1930 |
| 593,093 | Germany | Feb. 21, 1934 |
| 665,762 | Germany | Oct. 3, 1938 |